United States Patent
Hutchison et al.

(10) Patent No.: US 12,330,246 B2
(45) Date of Patent: Jun. 17, 2025

(54) SYSTEMS AND METHODS FOR ADDITIVE MANUFACTURING IN A CONTROLLED SHORT CIRCUIT WELDING SYSTEM

(71) Applicant: Illinois Tool Works Inc., Glenview, IL (US)

(72) Inventors: Richard Martin Hutchison, Iola, WI (US); Todd Gerald Batzler, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 81 days.

(21) Appl. No.: 16/426,845

(22) Filed: May 30, 2019

(65) Prior Publication Data
US 2019/0366466 A1    Dec. 5, 2019

Related U.S. Application Data

(60) Provisional application No. 62/678,590, filed on May 31, 2018.

(51) Int. Cl.
*B23K 9/04* (2006.01)
*B23K 9/073* (2006.01)
(Continued)

(52) U.S. Cl.
CPC ............ *B23K 9/042* (2013.01); *B23K 9/0732* (2013.01); *B23K 9/0953* (2013.01);
(Continued)

(58) Field of Classification Search
CPC .... B23K 9/042; B23K 9/0732; B23K 9/0953; B23K 9/0956; B23K 9/125; B23K 9/067;
(Continued)

(56) References Cited

U.S. PATENT DOCUMENTS

| 6,995,334 B1 * | 2/2006 | Kovacevic | B22F 10/25 219/121.64 |
| 11,772,194 B2 * | 10/2023 | Yamasaki | B22F 10/36 700/98 |

(Continued)

FOREIGN PATENT DOCUMENTS

| CN | 101128279 | 2/2008 |
| CN | 104661781 | 5/2015 |

(Continued)

OTHER PUBLICATIONS

Int'l Search Report and Written Opinion AppIn No. PCT/US2019/034812 mailed Sep. 24, 2019.

(Continued)

*Primary Examiner* — Dana Ross
*Assistant Examiner* — Abigail H Rhue
(74) *Attorney, Agent, or Firm* — McAndrews, Held & Malloy, Ltd.

(57) ABSTRACT

Disclosed is a welding system configured to perform additive manufacturing using a controlled short circuit welding process to apply a plurality of droplets of a wire to create a multilayer part comprised of the droplets. Operational parameters of the additive manufacturing system are dynamically adjusted based on data representing a temperature value and/or a geometric characteristic of the part. Based on the data, the controller can adjust one or more operational parameters to control application of droplets to build up the part.

19 Claims, 4 Drawing Sheets

(51) Int. Cl.
*B23K 9/095* (2006.01)
*B23K 9/12* (2006.01)
*B33Y 30/00* (2015.01)
*B33Y 50/02* (2015.01)

(52) U.S. Cl.
CPC ............ *B23K 9/0956* (2013.01); *B23K 9/125* (2013.01); *B33Y 30/00* (2014.12); *B33Y 50/02* (2014.12)

(58) Field of Classification Search
CPC .......... B23K 9/173; B23K 9/32; B23K 9/295; B23K 9/232; B23K 31/12; B23K 9/1093; B23K 26/043; B23K 9/09; B23K 9/1006; B23K 9/235; B23K 26/082; B23K 26/073; B23K 26/0648; B23K 26/0734; B23K 28/02; B23K 9/073; B23K 35/22; B23K 26/046; B23K 26/03; B23K 26/032; B23K 9/091; B23K 9/16; B23K 9/093; B23K 9/23; B23K 20/00; B23K 9/02; B23K 31/02; B23K 9/1062; B23K 9/1056; B23K 11/314; B23K 11/258; B23K 11/253; B23K 9/0737; B23K 9/1087; B23K 9/08; B23K 9/1043; B23K 9/0735; B23K 9/092; B23K 9/06; B23K 26/1423; B23K 35/0272; B23K 35/0283; B23K 26/14; B23K 35/0266; B23K 26/211; B23K 26/32; B23K 26/34; B23K 15/0046; B23K 35/0261; B23K 26/0861; B23K 10/027; B23K 26/034; B23K 9/18; B23K 26/1464; B23K 26/0884; B23K 37/0235; B23K 26/0853; B23K 26/0622; B33Y 30/00; B33Y 50/02; B33Y 10/00; B33Y 70/00; B33Y 80/00; B33Y 50/00; B05B 5/001; B05B 12/18; B05B 5/0255; B05B 7/226; B05B 7/22; B05B 7/228; B22F 3/115; B22F 7/064; B22F 10/00; B22F 10/10; B22F 10/20; B22F 12/00; B22F 10/30; B22F 2999/00; B22F 2203/03; G05B 19/41865; G05B 19/4099; G06F 30/00; B29C 64/112; B29C 64/393; B29C 64/40; B29C 64/118; C23C 4/131
See application file for complete search history.

(56) References Cited

U.S. PATENT DOCUMENTS

| | | | | |
|---|---|---|---|---|
| 2015/0209905 | A1* | 7/2015 | Matthews | B23K 9/173 |
| | | | | 219/76.14 |
| 2016/0243638 | A1* | 8/2016 | Berube | C22C 21/10 |
| 2016/0258045 | A1* | 9/2016 | Carter, Jr. | B23K 26/0884 |
| 2017/0145586 | A1* | 5/2017 | Xiao | B23K 9/044 |
| 2017/0158543 | A1 | 6/2017 | Metz | |
| 2017/0252828 | A1* | 9/2017 | Sachs | B33Y 50/02 |

FOREIGN PATENT DOCUMENTS

| | | |
|---|---|---|
| CN | 105081325 | 11/2015 |
| CN | 105873711 | 8/2016 |
| WO | 2016160140 | 10/2016 |

OTHER PUBLICATIONS

Canadian office action ApplN No. 3,99,793 dated Dec. 29, 2021.
European Examination Report Appln No. 19731517.9 dated Jul. 11, 2023.
European Examination Report Appln No. 19731517.9 dated Apr. 23, 2025.

* cited by examiner

SYSTEMS AND METHODS FOR ADDITIVE MANUFACTURING IN A CONTROLLED SHORT CIRCUIT WELDING SYSTEM

CROSS REFERENCE TO RELATED APPLICATIONS

This application is a Non-Provisional Patent Application of U.S. Provisional Patent Application No. 62/678,590 entitled "Systems and Methods for Additive Manufacturing in a Controlled Short Circuit Welding System" filed May 31, 2018, which is herein incorporated by reference in its entirety.

BACKGROUND

Additive manufacturing is a process that deposits material in a layered fashion to build up a part into a particular geometry. Conventional systems that employ metal welding techniques to create additive manufactured products (i.e. three-dimensional or 3D printing) must use high currents to generate an arc sufficient to form and deposit a metal droplet, consistent with typical gas metal arc welding (GMAW) techniques. The resulting droplets transfer a high amount of heat to the layers below, which can cause deformation of the part, such as sagging. Further, the droplets are often large, making fine detail near impossible, especially in view of the high heat required to generate an arc in conventional welding systems. Thus, there is a need for improved additive manufacturing systems and techniques that allow for fine control of metal deposition and part formation.

SUMMARY

The present disclosure relates generally to additive manufacturing systems. In particular, a welding system is configured to perform additive manufacturing using a controlled short circuit welding process to apply a plurality of droplets of a wire to create a multilayer part comprised of the droplets. More particularly, operational parameters of the additive manufacturing system are dynamically adjusted based on one or more inputs. For example, a controller can receive data representing a temperature value (e.g., from a sensor and/or a stored model), and/or a geometric characteristic of the part (e.g., from a sensor and/or a stored model). Based on the data, the controller can adjust one or more operational parameters, such as power output, application tool position, travel speed and/or angle, wire motor feeder speed and/or direction, to name but a few.

As a result, the additive manufacturing system disclosed herein controls formation and application of each droplet of the plurality of droplets to the part by dynamic adjustment of the system operational characteristics, providing finer control for a more detailed layered part.

DRAWINGS

The figures are not necessarily to scale. Where appropriate, similar or identical reference numbers are used to refer to similar or identical components.

DETAILED DESCRIPTION

Figure 1:
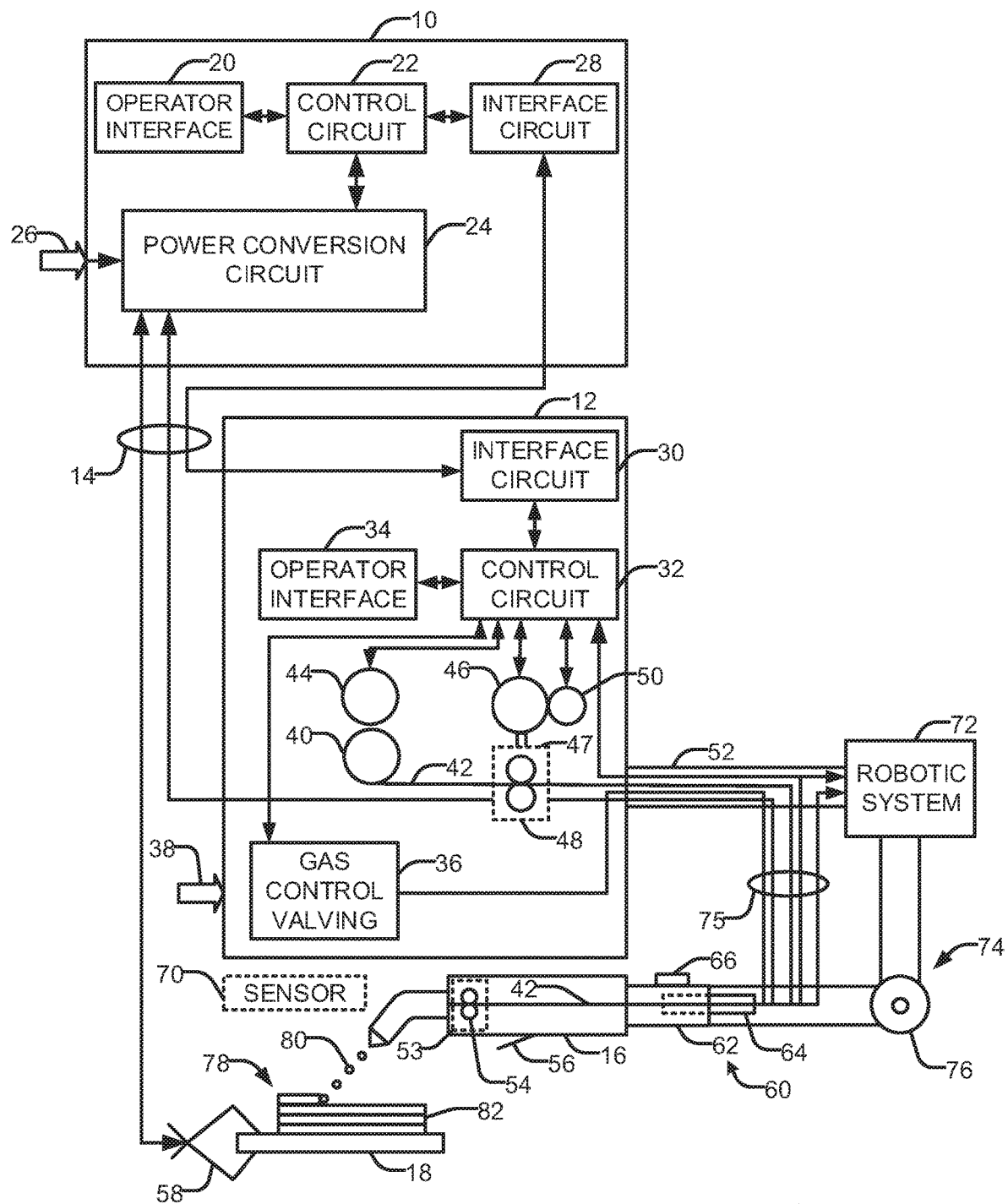
FIG. 1 illustrates an additive manufacturing system employing a controlled short circuit welding process to create a multilayer part, in accordance with aspects of this disclosure.

The present disclosure describes systems and methods for forming a multilayered part by additive manufacturing techniques. In particular, an additive manufacturing system employs sensor data and stored geometric and thermal models in conjunction with a controlled short circuit welding process to build up the part by application of a plurality of droplets into a series of layers.

Additive manufacturing is any of various processes in which material is joined or solidified under computer control to create a three-dimensional object, with material being added together in a layered fashion. For example, three-dimensional (3D) printing is used in both rapid prototyping and additive manufacturing using technologies such as stereolithography (STL) or fused deposit modeling (FDM).

Through additive manufacturing techniques, objects of almost any shape or geometry can be created, typically by use of digital three-dimensional model. Traditional techniques for creating an object like injection molding can be less expensive for manufacture of some products in high quantities. By contrast, additive manufacturing may be faster, more flexible and/or less expensive when producing fewer parts. Thus, additive manufacturing systems give designers and manufacturers the ability to produce parts and concept models in less time with greater flexibility. Thus, unlike material removed from a stock in conventional machining processes, additive manufacturing builds a three-dimensional object from a computer-aided design (CAD) model or Additive Manufacturing File Format (AMF) file, usually by successively adding material (e.g., an electrode wire) layer by layer.

Conventional systems that employ metal welding techniques to create additive manufactured products (i.e. 3D printing) must use high currents to generate an arc sufficient to form and deposit a droplet, consistent with typical gas metal arc welding (GMAW) techniques. The result is droplets that transfer a high amount of heat to the layers below, which can cause deformation such as sagging. Further, the droplets are often large, making fine detail near impossible, especially in view of the high heat required to generate an arc in conventional welding systems.

By contrast, the disclosed additive manufacturing process provides fine control of heat output and deposition rates. Thus, thinner gauge wires can be used, and/or wires with a variety of melting temperatures. The result is dynamic adjustment of the wire droplet application based on input from one or more sensors or models, thereby allowing for thinner structures with less deformation versus additive manufacturing products created through conventional systems.

Advanced forms of welding, such as controlled short circuit welding, are based upon generation of cyclic pulses that may cause controlled short circuits between the wire electrode and the advancing weld puddle comprising of melted metal of the workpieces and the wire electrode. Various pulsed regimes may be carried out in which current and/or voltage pulses are commanded by the power supply control circuitry to regulate the formation and deposition of metal droplets (and/or spray, and/or globules) from the welding wire, to sustain a desired heating and cooling profile of the weld puddle, to control short circuits between the wire and the weld puddle, and so forth.

For example, a short circuit cycle welding process operates by alternating between a short circuit event and an arc event. For instance, the arc event can be adjusted to control the short circuit clearance occurrence. In an example, it is desirable for the molten droplet from the welding wire to enter the weld puddle at a relatively low current level during the welding process (e.g., a MIG welding process). If the current level is too high, the normal "wetting" action between the droplet and the puddle is interrupted by a high Lorentz "pinch" force at the droplet/puddle interface. This interruption of the droplet transfer process can result in large spatter droplets being expelled by the process.

To avoid such unnecessary spatter, phases of the arc event are set such that a predetermined current level is reached prior to the short circuit event. In particular, the phases of the arc event have the same independently adjustable parameters as described with respect to the short circuit phases. For example, the current levels can be reduced much more quickly during the arc phases, as higher voltage is available during the arc phases to drive energy from the output inductor.

To provide additional control to the CSC process, one or more reciprocating wire feeder motors can be employed to advance and/or retract the wire to ensure a desired weld speed, deposition rate, temperature, etc. One challenge associated with controlled short circuit (CSC) welding arises as the wire is being retracted. For example, the welding wire is being fed toward the workpiece by a first wire feeder motor, and has momentum in that direction. By definition, the second, or reciprocating, wire feeder motor moves the wire in the opposite direction (often in a cyclical fashion based on the short circuit cycle). Thus, a buffer is employed in the system disclosed herein to mitigate the effects from the reciprocating movement in the wire.

As described more completely with respect to the several figures, an additive manufacturing system includes an additive manufacturing tool, such as a welding type torch. The tool is configured to receive a metallic electrode wire, which is heated by a power supply to create droplets for deposition to create the part by building up successive layers of metal. The additive manufacturing system operates in coordination with a controlled short circuit welding process, which includes a wire feeder motor configured to move the wire to and away from the part to control heat and/or deposition rate of the wire during the process.

One or more controllers receive information from a variety of sources, such as stored thermal and/or three-dimensional geometric models, sensor data, and/or user or sequence inputs, to determine variables associated with the process. For example, the controller can determine a temperature of a region of the part upon which a droplet of the plurality of droplets is to be applied in advance of deposition. Additionally, the controller determines a geometric characteristic of the part associated with the region.

Based at least in part on these determinations, the controller may adjust an operational characteristic of the power supply, the wire feeder motor, or a robotic system, in response to the temperature or the geometric characteristic. In this manner, the system is configured to dynamically control formation and application of each droplet to the part, as the part is built up over successive layers.

Employing the systems and methods describe herein serve to increase arc welding process stability, and decrease spatter generation during welding. The resulting process is more responsive to dynamically changing process variables, such as contact tip to work distance (CTWD), welding torch travel speed, welding torch angle, workpiece material thickness, and joint configuration, among other variables.

As used herein, the term "additive manufacturing", as used herein, is a manufacturing process in which material is joined or solidified under computer control to create a three-dimensional object, with material being added together in a layered fashion.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "pulsed welding" or "pulsed MIG welding" refers to techniques in which a pulsed power waveform is generated, such as to control deposition of droplets of metal into the progressing weld puddle.

As used herein, the term "boost converter" is a converter used in a circuit that boosts a voltage. For example, a boost converter can be a type of step-up converter, such as a DC-to-DC power converter that steps up voltage while stepping down current from its input (e.g., from the starter battery) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

As used herein, the term "memory" includes volatile and non-volatile memory, and can be arrays, databases, lists, etc.

As used herein, the term "torch," "tool" or "welding-type tool" can include a hand-held or robotic welding torch, gun, or other device used to create the welding arc.

As used herein, the term "buffer", as used herein, includes components used to take up the wire when the wire direction is reversed and provide wire when the wire is advanced.

FIG. 1 illustrates an example arc welding system for performing controlled short circuit (CSC) welding operations to create objects by additive manufacturing techniques. As shown in the arc welding system of FIG. 1, a power supply 10 and a wire feeder 12 are coupled via conductors or conduits 14. In the illustrated example, the power supply 10 is separate from the wire feeder 12, such that the wire feeder may be positioned at some distance from the power supply near a welding location. However, in some examples the wire feeder may be integrated with the power supply 10. In such cases, the conduits 14 would be internal to the system. In examples in which the wire feeder 12 is separate from the power supply 10, terminals are typically provided on the power supply and on the wire feeder 12 to allow the conductors or conduits to be coupled to the systems so as to allow for power and gas to be provided to the wire feeder 12 from the power supply 10, and to allow data to be exchanged between the two devices.

The system is configured to provide wire, power and shielding gas to an additive manufacturing tool or welding torch 16. The tool 16 may be of many different types, and may allow for the feed of a welding wire 42 (e.g., an electrode wire) and gas to a location adjacent to a substrate or platform 18 upon which a part 78 that includes layers 82 is to be formed by application of metal droplets 80. A second conductor is run to the welding workpiece so as to complete an electrical circuit between the power supply and the workpiece.

The welding system is configured for data settings to be selected by the operator and/or a welding sequence, such as via an operator interface 20 provided on the power supply 10. The operator interface 20 will typically be incorporated into a front faceplate of the power supply 10, and may allow for selection of settings such as the weld process, the type of wire to be used, voltage and current settings, and so forth. In particular, the system is configured to allow for welding with various steels, aluminums, or other welding wire that is channeled through the tool 16. Further, the system is configured to employ welding wires with a variety of cross-sectional geometries (e.g., circular, substantially flat, triangular, etc.). These weld settings are communicated to a control circuit 22 within the power supply. The system may be particularly adapted to implement welding regimes configured for certain electrode types.

Additionally or alternatively, process instructions for additive manufacturing can be provided via a weld sequence program, such as stored on a memory accessible to a processor/control circuit 22 associated with the power supply 10. In such a case, the sequencer can employ stored information (e.g., associated with a desired product configuration and/or process, including historical data), and/or customizable by a user. For instance, information associated with a particular design (e.g., one or more three-dimensional models and/or thermal profiles associated with the part 78, material characteristics, system control parameters, etc.) corresponding to the part 78 can be stored in a memory and/or provided via a network interface, as described in greater detail with respect to FIG. 2. Thus, the information can be used to control operation of the system to facilitate formation of the part 78, such as by controlling a power output from the power supply 10, wire feeder motors 48, 54, robotic system 72, etc.

The control circuit 22, described in greater detail below, operates to control generation of welding power output that is supplied to the welding wire 42 for carrying out the desired additive manufacturing operation. In examples, the control circuit 22 may be adapted to regulate a pulsed MIG welding regime that promotes short circuit transfer of molten metal to the substrate 18 in order to build up multiple layers 82 of the part 78, without adding excessive energy to the part 78 or the welding wire 42. In "short circuit" modes, droplets of molten material form on the welding wire 42 under the influence of heating by the welding arc, and these are periodically transferred to the part 78 by contact or short circuits between the welding wire 42 and droplets 80 and the layers 82.

In this manner, the system and/or the control circuit 22 controls formation of the part 78 by adjusting one or more operational characteristics of the system during the additive manufacturing process. The operational characteristics may include, but are not limited to, wire feeder speed, wire feeder direction, travel speed, power output, process mode, deposition path, deposition sequence, torch angle, etc.

Additionally, a sensor(s) 70 can measure operational parameters associated with operation of the system (e.g., current, voltage, inductance, phase, power, inductance, speed, acceleration, orientation, position, etc.). The sensed operational characteristic (e.g., voltage, current, temperature, shape, speed, etc.) can be provided to the control circuit 22 or other controller (e.g., control circuit 32, a controller associated with the robotic system 72, etc.) to further control the additive manufacturing process.

Power from the power supply is applied to the wire electrode 42, typically by a welding cable 52. Similarly, shielding gas is fed through the wire feeder and the welding cable 52. During welding operations, the welding wire 42 is advanced through a jacket of the welding cable 52 towards the tool 16. Within the tool 16, a second wire feeder motor 53 comprises rollers 54 may be provided with an associated drive roller, which can be regulated to provide the desired wire feed speed and/or direction.

A robotic system 72 can be employed to regulate movement and position of the tool 16 in accordance with the control circuits 22, 32, as well as information from sensor(s) 70, for example. In examples, the robotic system 72 may be in communication with the power supply 10, the wire feeder 12 and/or the tool 16 via one or more cables 75. Thus, power and/or information can be provided and/or exchanged via cable 75 to control the additive manufacturing process. In particular, the robotic system 72 can employ one or more arms 74 having one or more actuators 76 (e.g., servo motors, joints, etc.). In this way, the robotic system 72 can command fine control of the attached tool 16 in six degrees of freedom during the welding operation, including travel speed, tool location, distance from the part 78, etc. The robotic system 72 may include one or more sensors to sense operational characteristics, which can be communicated with the control circuits 22, 32 to further facilitate formation of the part 78. In some examples, the tool 16 includes a trigger 56 for controlling the tool 16.

In some examples, the control circuits 22, 32 may provide a signal to the wire feeder 12, the power supply 10, and or the robotic system 72 to enable the additive manufacturing process to be started and stopped in accordance with a particular part design. That is, upon initiation of the process, gas flow may begin, wire may advance, and power may be applied to the welding cable 52 and through the tool 16 to the advancing welding wire 42. A workpiece cable and clamp 58 allow for closing an electrical circuit from the power supply through the welding torch, the electrode (wire), and the part 78 for maintaining the welding arc during the operation.

The present arc welding system allows for control of successive voltage and/or current levels and/or pulse durations based on previous current and duration measurements so as to control the promotion, occurrence, duration, and interruption of short circuit events between the welding wire electrode and the advancing weld puddle. In particular, current peaks in waveforms are regulated based on one or more preceding short circuit events, or aspects of the short circuit events, such as its duration.

The control circuit 22 is coupled to power conversion circuit 24. This power conversion circuit 24 is adapted to create the output power, such as pulsed waveforms applied to the welding wire 42 at the tool 16. Various power conversion circuits may be employed, including choppers, boost circuitry, buck circuitry, inverters, converters, and so forth. The configuration of such circuitry may be of types generally known in the art in and of itself. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells or other alternative sources. The power supply illustrated in FIG. 1 may also include an interface circuit 28 configured to allow the control circuit 22 to exchange signals with the wire feeder 12.

The wire feeder 12 includes a complimentary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both.

The wire feeder 12 also includes control circuit 32 coupled to the interface circuit 30. As described below, the control circuit 32 allows for wire feed speeds to be controlled in accordance with operator selections or stored sequence instructions, and permits these settings to be fed back to the power supply via the interface circuit. The control circuit 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuit 32 may also be coupled to gas control valving 36 which regulates the flow of shielding gas to the torch. In general, such gas is provided at the time of welding, and may be turned on immediately preceding the weld and for a short time following the weld. The gas applied to the gas control valving 36 may be provided in the form of pressurized bottles, as represented by reference numeral 38.

The wire feeder 12 includes components for feeding wire to the welding tool 16 and thereby to the welding application, under the control of control circuit 32. For example, one or more spools of welding wire 40 are housed in the wire feeder. Welding wire 42 is unspooled from the spools and is progressively fed to the tool 16. The spool may be associated with a clutch 44 that disengages the spool when wire is to be fed to the tool. The clutch 44 may also be regulated to maintain a minimum friction level to avoid free spinning of the spool 40. The first wire feeder motor 46 may be provided within a housing 48 that engages with wire feed rollers 47 to push wire from the wire feeder 12 towards the tool 16.

In the example of FIG. 1, a moveable buffer 60 can include a first portion 62 and a second portion 64, where at least one of the first and second portions are configured to move relative the other portion in response to a change in the amount of welding wire 42 between a first wire feeder motor 46 and a second wire feeder motor 53. A sensor 66 (e.g., one or more sensors) is configured to sense relative movement or displacement between the first and second portions and provide sensor data to control circuit (e.g., control circuit 22, 32) to adjust a speed and/or direction of the welding wire 42 in response.

In practice, at least one of the rollers 47 is mechanically coupled to the motor and is rotated by the motor to drive the wire from the wire feeder, while the mating roller is biased towards the wire to maintain good contact between the two rollers and the wire. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer are fed back to the control circuit 32, such as for continued or periodic monitoring, calibration, etc. In some examples, the system includes a wire spool motor for rotating the wire feeding device, which can be similarly adjusted to increase or decrease the amount of wire between wire feeder motors.

In some examples, the wire feeder 12 can be configured to reverse the direction of the welding wire 42. Moreover, although described as operating with two wire feeders and/or wire feeder motors (e.g., wire feeder motors 46 and 53), the system can operate with a single wire feeding unit to advance and/or reverse wire during formation of the part. Additionally or alternatively, in some examples, one wire feeder may be configured to advance the wire while another wire feeder is configured to reverse the direction of the wire. In this example, one or more control circuit (e.g., control circuits 22, 32) coordinates operation of the two wire feeders to implement a CSC welding process in an additive manufacturing system, as disclosed herein.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Although described with respect to an arc welding-type system, the disclosed system may be implemented in conjunction with a variety of technologies to conduct additive manufacturing processes. In but one example, additive manufacturing may employ a laser to melt a material to build up a layered part in a manner similar to the systems and methods disclosed herein.

Figure 2:
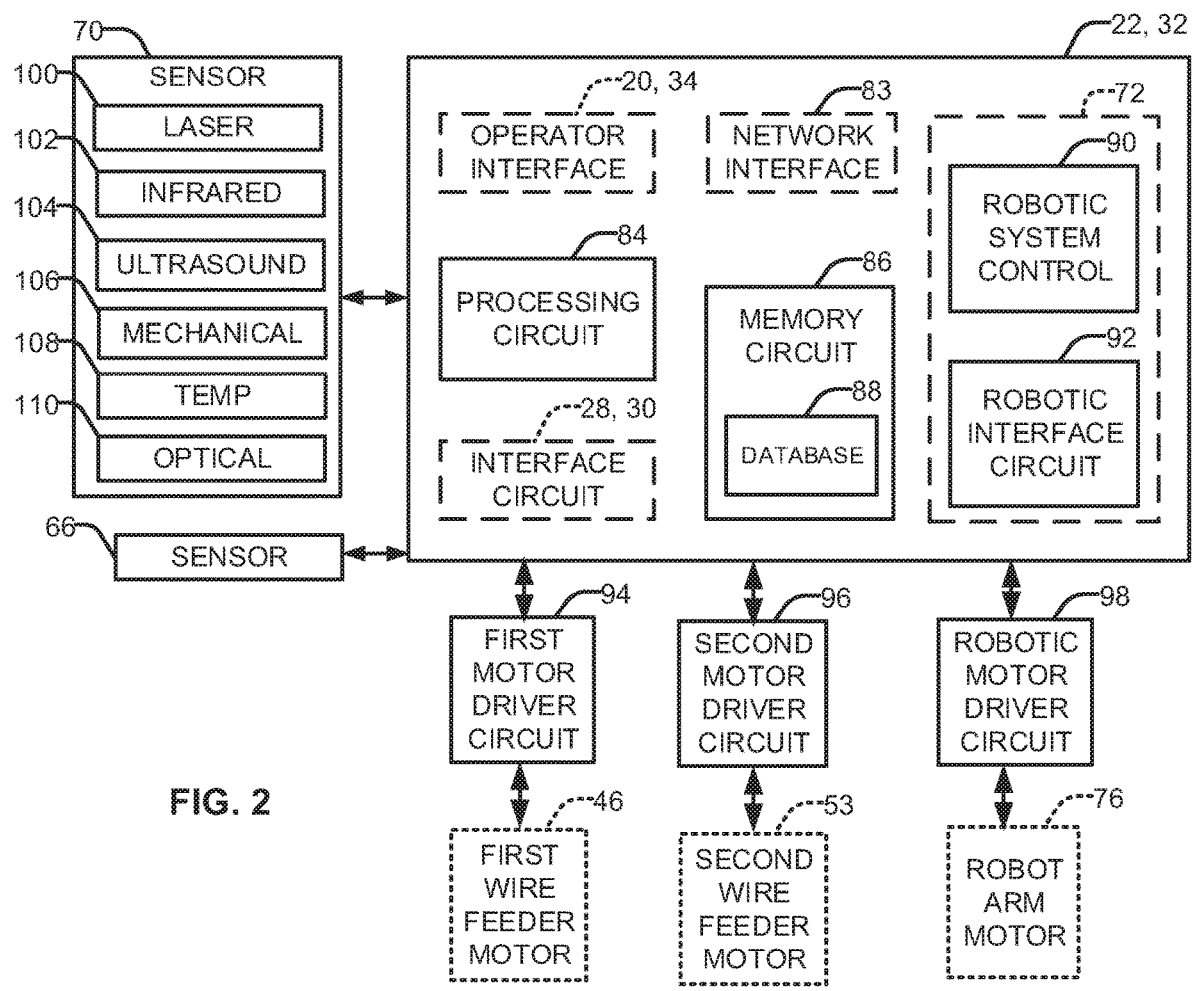
FIG. 2 is a graphical representation of example control circuit components for an additive manufacturing system of the type shown in FIG. 1, in accordance with aspects of this disclosure.

FIG. 2 illustrates example control circuit, such as one or both of control circuits 22, 32, configured to function in a system of the type illustrated in FIG. 1, as well as FIG. 3, described below. The overall circuitry may include the operator interfaces 20 and 34 and/or interface circuits 28 and 30. For example, the various interfaces can provide communication of operational parameters, including user input and networked information via network interface 83, as well as information from downstream components such as a wirefeeder, a welding torch/tool, and various sensors and/or actuators.

The control circuit includes a processing circuit 84 which itself may include one or more application-specific or general purpose processors. The processing circuit 84 may be further configured to carry out welding sequences such as corresponding to formation of a particular additive manufacturing part. The processing circuit 84 can receive information regarding the part from a database 88 stored in a memory circuit 86, and/or receive the information from a networked computer and/or a user input. Based on the information, the processing circuit 84 can control and/or coordinate actions of the system components by making computations for implementation of an additive manufacturing process.

The various models and inputs can be correlated based on a number of variables of the additive manufacturing process. For example, geometric features of the three-dimensional model may correspond to a point in time and/or space associated with the process and/or part. For instance, a first or base layer of the part may correspond with an earlier time than a later applied layer. The thermal model may similarly correspond to the process timeline, as well as correspond to the feature of the three-dimensional model at that point in time. The welding sequence can also be synced to the models, to ensure that the welding operation is adjusted to correspond to the requirements of the models.

In an example, the thermal model may anticipate a temperature at a region of the part upon which a wire droplet is to be applied. Along with information regarding a geometric characteristic of the part associated with the region, the processing circuit 84 may adjust an operational characteristic of one or more components of the system (e.g., the power supply, the wire feeder, the robotic system, etc.) based on at least one of the temperature or the geometric characteristic. In this manner, the system controls formation and application of each droplet used to create the part, including location of the droplet, amount of power and/or heat associated with the application, speed and direction of the application tool (e.g., the torch 16), wire feed speed and/or direction, wherein the plurality of droplets is configured to build up the part.

In some examples, the sensor 70 includes a laser sensor 100 configured to scan the part periodically or continuously during the additive manufacturing process. This scan can be fed back to the processing circuit to compare with the three-dimensional model, to either ensure that the part being formed conforms to the three-dimensional model, and/or to identify variations. Based on the comparison, the processing circuit 84 can adjust one or more operational characteristics of the system to facilitate formation of the part.

Additionally or alternatively, sensor 70 may include an infrared sensor 102, an ultrasound sensor 104, a mechanical sensor 106, or a thermal sensor 108, an optical sensor 110, to name but a few. Similarly, sensor data from the various sensors can be fed back to the processing circuit 84 for analysis and control of operational characteristics. In an example, temperature data from thermal sensor 108 can be compared to the thermal model, such that if the measured temperature does not align with the model (e.g., during deposition at a particular region at a particular stage of part formation), the processing circuit 84 can adjust a system operational characteristic to correct the deviation.

By coordinating control of the various systems, the part may include finer detail with fewer negative effects associated with conventional metal deposition techniques. In conventional systems, high welding power is needed to form metal droplets to build an object. The result is a high level of heat maintained at the deposition cite, which can lead to sagging as well as imprecise placement of droplets. Further, high power levels typically force relatively large amounts of metal to dislodge from the electrode as droplets. Thus, fine features, such as sharp turns, thin walls, miniature components, complex shapes, etc., are beyond the capabilities of conventional machines.

By contrast, the additive manufacturing system disclosed herein employs a controlled short circuit processes to apply metal droplets of varying size and at varying levels of power and/or heat. As a result, a greater range of materials is available to the additive manufacturing system employing, as well as application of thinner, more detailed geometric features.

In some examples, robotic system 72, which may include a robotic system control 90 and/or robotic interface circuit 92, can be integrated with one or more components of the circuitry, such as control circuits 22, 32. In other examples, all or part of the robotic system 72 can be located remotely from one or both of the power supply or the wire feeder, and communicate via the robotic interface circuit 92 and one or more of the interface circuits 23, 34, 28, 30, 83.

The robotic system 72 is in communication with the processing circuit 84, as well as the plural interfaces and memory circuit 86. The robotic control system 90 is configured to control operation of the robotic arm 74 via control of a robotic motor drive circuit 98 which controls a robotic arm motor or actuator 76. In this way, the location and/or orientation of the tool 16 is controlled in coordination with data provided by sensors, models, inputs, etc. As a result, geometric features of the part are formed by control of multiple variables that contribute to creation of the part.

Additionally or alternatively, one or more of the interfaces (e.g., interface circuits 28, 30; operator interfaces 20, 34) can provide information corresponding to operational parameters of the system. In this example, operational parameter information can be provided by one or more of the wire feeder motors, such as current draw, voltage, power, inductance, wire feed speed, wire feed acceleration, wire feeder motor angle, torque, position, etc., which can be analyzed by the processing circuit 84 to indirectly determine one or more operational characteristics. This process can be implemented in conjunction with the sensors 70 and/or 66 or without to achieve a similar result.

In some examples, the processing circuit 84 includes a timer, a speed sensor, or other sensor that may provide information regarding the additive manufacturing process, such as the amount of wire consumed, an estimate of the anticipated progress for the manufacturing process, etc. Additionally or alternatively, the control circuits 22, 32 can be configured to monitor and/or adjust a power output characteristic (e.g., current, voltage, power, phase, etc.) associated with the power supply.

Particular threshold amounts employed to make determinations for adjustment (e.g., associated with operating voltage, current, power, temperature, shape, speed, etc.), as well as the amount of change implemented in response to a determination by the control circuit, can be predetermined by a welding sequence particular to a welding operation, based on sensor data, trend data analyzed during the welding operation, on networked information from similar welding systems, input by an operator, determined by algorithms to control the CSC process, etc., or any combination thereof.

The processing circuit 84 is further configured to control a first motor driver circuit 94 and a second motor driver circuit 96. The processing circuit 84 provides control signals to the first and second motor driver circuits to adjust a speed and/or direction of the first wire feeder motor 46 and/or the second wire feeder motor 53 in response to information corresponding to an amount of wire between the two wire feeder motors. In particular, the sensor 66 can monitor a relative movement between the first portion and second portion of the moveable buffer 60, and provide data to the processing circuit 84 for analysis and determination.

For instance, if the moveable buffer indicates too much wire is between the first and second wire feeder motors (e.g., via sensor 66, from monitoring operational parameters, etc.), the current applied to the wire electrode can be increased to increase wire deposition rate. Conversely, if the moveable buffer indicates too little wire is between the first and second wire feeder motors, the current can be decreased, thereby decreasing the wire deposition rate. In this manner, the change in output will change the amount of wire being consumed during the welding process, thereby facilitating a return of the moveable buffer to within the threshold amount 70.

The processing circuit 84 will also be associated with memory circuitry 86 which may consist of one or more types of permanent and temporary data storage, such as for providing the welding sequences implemented, storing the three-dimensional and thermal models, storing operational characteristics, storing weld settings, storing error logs, etc. The adjustment of the operational characteristics can be made by reference and/or comparison to historical data from preceding additive manufacturing operations, which can also be stored on memory circuit 86. For instance, adjustment may be made on the basis of stored data based on an historical analysis of a similar additive manufacturing operation. The historical data can correspond to, for example, operational parameters, other sensor data, a user input, as well as data related to trend analysis, threshold values, profiles associated with a particular mode of operation, etc., and can be stored in a comparison chart, list, library, etc., accessible to the processing circuit 84.

Figure 3:
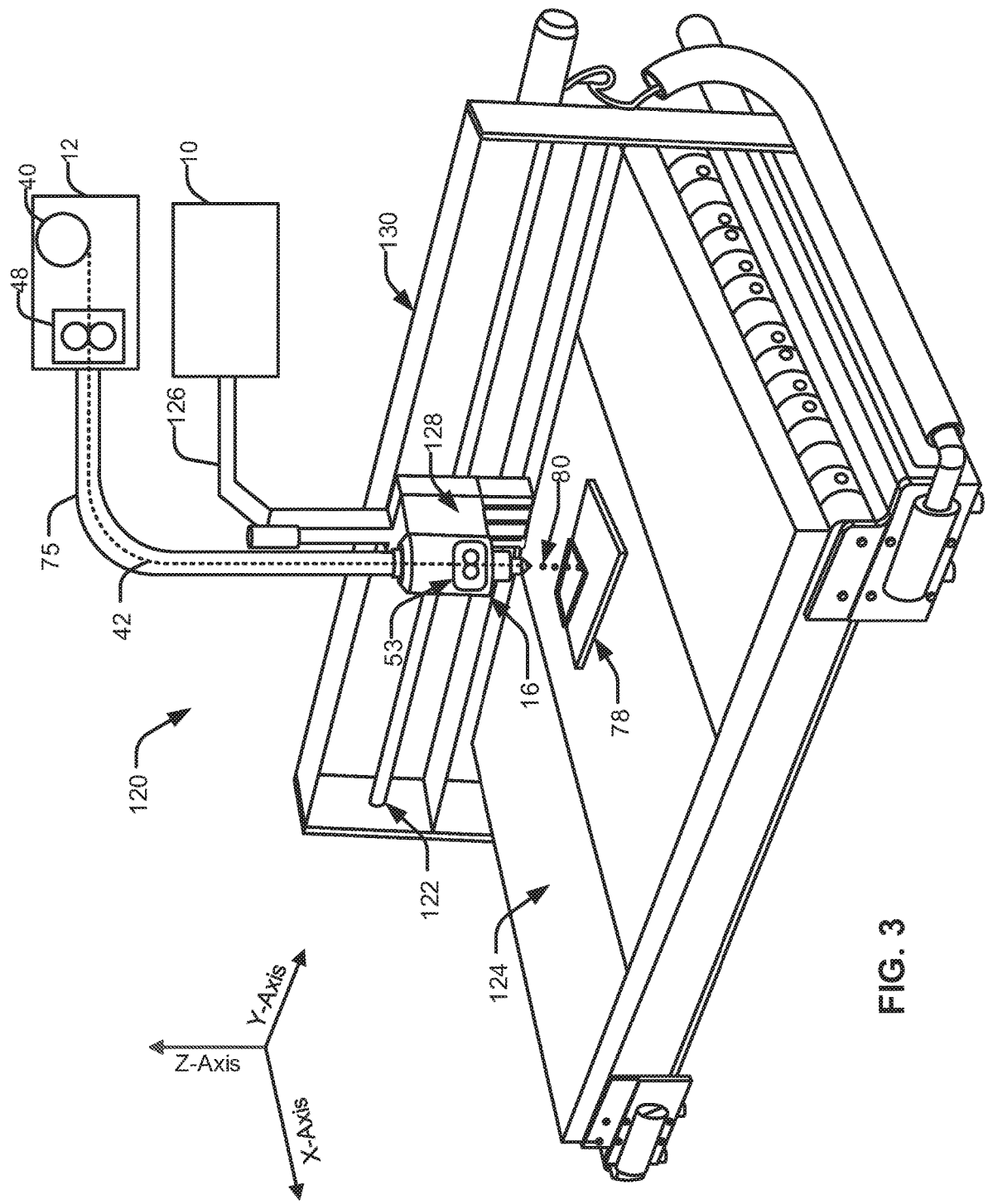
FIG. 3 illustrates another example additive manufacturing system employing a controlled short circuit welding process to create a multilayer part, in accordance with aspects of this disclosure.

FIG. 3 illustrates an example additive manufacturing system implemented on a computer numerical control (CNC) platform 120. The CNC platform 120 includes an additive manufacturing tool or torch 16, which is provided with welding wire 42 from a wire feeder 12 via a conduit 75. Power and/or control is provided by power source 10 via conduit 126, although in some examples the wire feeder 12 and power source 10 are integrated. The welding wire 42 is provided to the tool 16, which optionally includes a wire feeder motor 53. Droplets 80 are formed from the advancing welding wire 42 to form layers of a part 78.

The CNC platform 120 includes a substrate 124 upon which the part is formed. The position and/or orientation of the tool 16 is controlled by a motorized unit 128 configured to adjust an angle of the tool, distance of the tool to the part 78 in the Z-axis, etc. The motorized unit 128 can be mounted on one or more rails 122 to allow for movement in the Y-axis. A frame 130 is configured to traverse the substrate 124 in the X-axis. When operated in concert, the CNC platform 120 allows for a range of movement in six degrees of freedom.

The CNC platform 120 can perform an additive manufacturing process using a similar circuit as provided in FIG. 2. For example, the CNC platform 120 operates in a manner similar to a robotic system, which can be guided by model data and/or sensor data. The coordinated system is therefore suited to achieve the benefits of lower heat and finer control disclosed herein by comparison to conventional systems.

Figure 4:
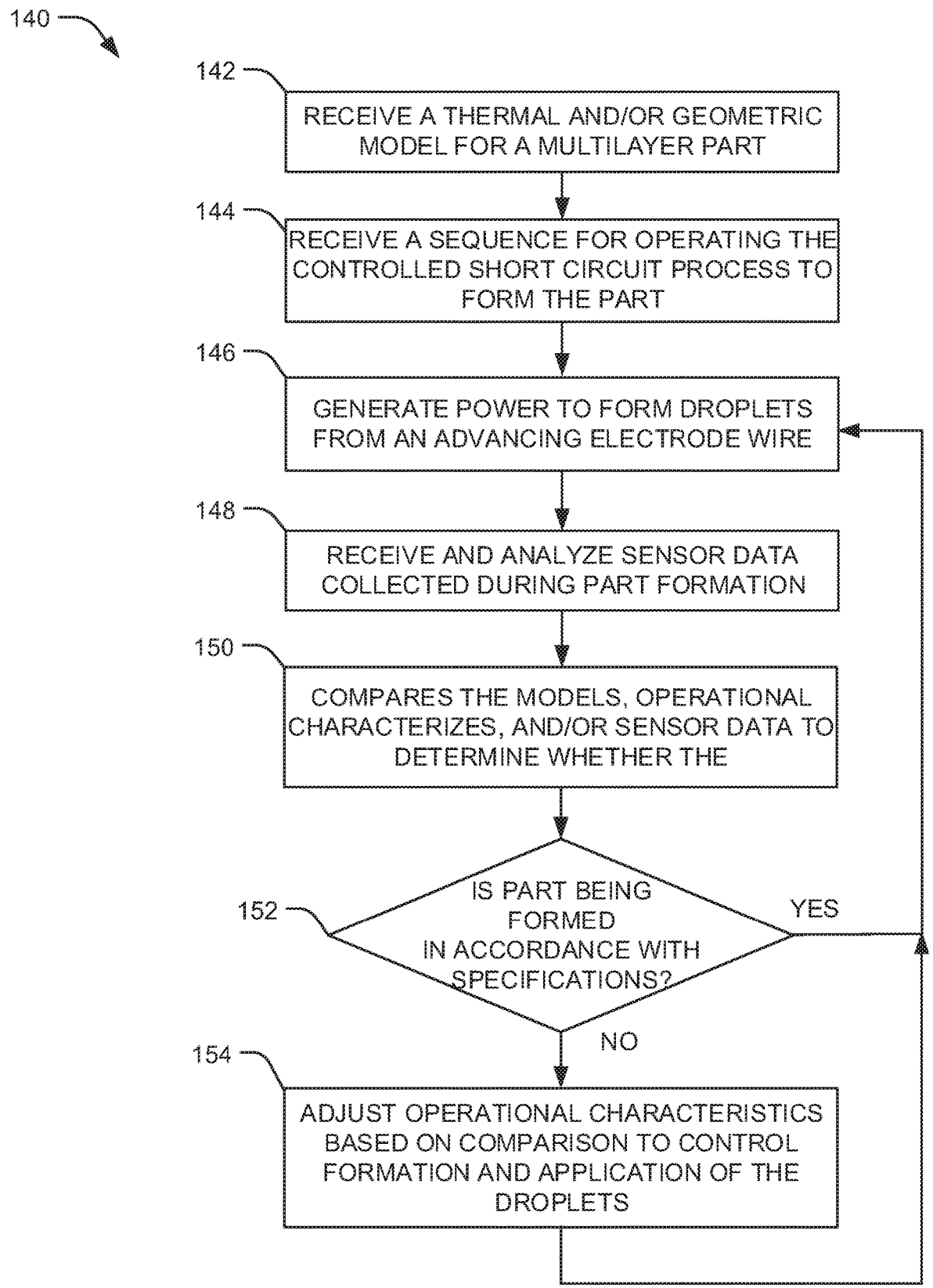
FIG. 4 illustrates a method of forming a multilayer part by an additive manufacturing system employing a controlled short circuit welding process, in accordance with aspects of this disclosure.

FIG. 4 illustrates a method 140 of forming a multilayer part using an additive manufacturing system, such as described with respect to FIGS. 1-3. In block 142, the system receives a thermal and/or geometric model for a multilayer part. In some examples, the model includes one or more operational characteristics associated with a controlled short circuit process with respect to the models.

In block 144, the system receives a sequence for operating the controlled short circuit process to form the part. In block 146, the system generates power to form droplets from an advancing electrode wire by employing the controlled short circuit process, as described herein. In block 148, the system receives and analyzes sensor data collected during part formation.

In block 150, the system compares the models, operational characterizes, and/or sensor data. In block 152, the system determines whether the part is being formed in accordance within desired specifications during the part formation process. If the part is being formed in accordance within desired specifications, the method returns to block 146 and continues generating power to form droplets from the electrode wire to form the part. If the part is not being formed in accordance within desired specifications, the method advances to block 154 to adjust one or more operational characteristics of the system based on the comparison to control formation and application of the droplets to build up the part. The method then returns to block 146 to continue formation of the part following adjustment of the one or more operational characteristics of the system.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. An arc welding additive manufacturing system, comprising:
    an arc welding additive manufacturing tool configured to receive a wire and to apply a plurality of droplets of the wire to a part comprising a plurality of layers, each layer comprising one or more droplets, wherein the additive manufacturing tool is a welding type tool to supply the plurality of droplets by melting the wire by creating an arc between the wire and the part;

a wire feeder configured to move the wire to and away from the part; and a controller comprising one or more control circuits and configured to determine at least one of:
- a temperature of a region of the part upon which a droplet of the plurality of droplets is to be applied; and
- a geometric characteristic of the part associated with the region, wherein the controller is further configured to:
  - in the case that the temperature of the region of the part is determined, change a size of the plurality of droplets by adjusting an operational characteristic of the system to form droplets of the plurality of droplets with varying sizes in response to the temperature of the region of the part, and control application of the droplets with varying sizes to the region of the part based on the temperature of the region of the part, wherein the plurality of droplets is configured to build up the part at the region; and
  - in the case that the geometric characteristic of the part associated with the region is determined, change a size of the plurality of droplets by adjusting an operational characteristic of the system to form droplets of the plurality of droplets with varying sizes in response to the geometric characteristic of the region of the part, and control application of the droplets with varying sizes to the region of the part based on at the geometric characteristic of the region of the part, wherein the plurality of droplets is configured to build up the part at the region.

2. The system of claim 1, wherein the controller is further configured to:
receive one or more three-dimensional models of the part; and
adjust a wire feeder speed or a wire feeder direction of the wire feeder based on one or more of the three-dimensional models.

3. The system of claim 2, wherein the controller is further configured to:
receive a thermal model of the part;
receive data from a sensor; and
adjust the operational characteristic based on the model or the data.

4. The system of claim 3, wherein the thermal model comprises a plurality of stored temperature values.

5. The system of claim 3, wherein the controller is further configured to communicate sensor data to one or more remote systems via an interface to update the one or more of the three dimensional models.

6. The system of claim 3, wherein the sensor comprises one or more of an optical sensor, a laser scanner, an infrared sensor, an ultrasound sensor, a mechanical sensor, or a thermal sensor.

7. The system of claim 1, wherein the operational characteristic corresponds to an operational characteristic of the additive manufacturing tool, the controller further configured to adjust the operational characteristic in response to at least one of the temperature or the geometric characteristic to control formation and application of each droplet of the plurality of droplets to the part.

8. The system of claim 7, wherein the operational characteristic comprises a travel speed, a power output, a process mode, a deposition path, a deposition sequence, or a tool angle.

9. The system of claim 1, wherein the additive manufacturing tool is configured to operate on a motorized control system configured to position the additive manufacturing tool relative to the part based on the one or more three-dimensional models or the temperature.

10. The system of claim 9, wherein the motorized control system is configured to operate on a computer numerical control (CNC) platform or a robotic welding platform.

11. An additive manufacturing system, comprising:
an additive manufacturing tool configured to receive a wire and to apply a plurality of droplets of the wire to a part comprising a plurality of layers, each layer comprising one or more droplets, wherein the additive manufacturing tool is a welding-type tool to supply the plurality of droplets by melting the wire by creating an arc between the wire and the part;
a wire feeder configured to move the wire to and away from the part; and
a controller comprising one or more control circuits and configured to determine at least one of:
- a temperature of a region of the part upon which a droplet of the plurality of droplets is to be applied; and
- a geometric characteristic of the part associated with the region, wherein the controller is further configured to:
  - in the case that the temperature of the region of the part is determined, change a size of the plurality of droplets by adjusting an operational characteristic of the wire feeder to form droplets of the plurality of droplets with varying sizes in response the temperature of the region of the part, and control application of the droplets with varying sizes to the region of the part based on the temperature of the region of the part, wherein the plurality of droplets is configured to build up the part at the region; and
  - in the case that the geometric characteristic of the part associated with the region is determined, change a size of the plurality of droplets by adjusting an operational characteristic of the system to form droplets of the plurality of droplets with varying sizes in response to the geometric characteristic of the region of the part, and control application of the droplets with varying sizes to the part based on the geometric characteristic of the region of the part, wherein the plurality of droplets is configured to build up the part at the region.

12. The system of claim 11, wherein the controller is further configured to determine the temperature of the region based on a property of a material of the wire, a measured temperature at the region, or a power output from the additive manufacturing tool.

13. The system of claim 11, wherein the geometric characteristic of the part comprises a thickness, a length or a width.

14. An additive manufacturing system, comprising:
an additive manufacturing tool configured to receive a wire and to apply a plurality of droplets of the wire to a part comprising a plurality of layers, each layer comprising one or more droplets, wherein the additive manufacturing tool is a welding type tool to supply the plurality of droplets by melting the wire by creating an arc between the wire and the part;
a welding type power supply to provide power to heat the wire to create droplets of the plurality of droplets with varying sizes;
a wire feeder configured to move the wire to and away from the part; and a controller comprising one or more control circuits and configured to determine at least one of:
- a temperature of a region of the part upon which a droplet of the plurality of droplets is to be applied; and
- a geometric characteristic of the part associated with the region, wherein the controller is further configured to:
- in the case of the temperature of the region of the part being determined, adjust an operational characteristic of the welding type power supply including a contact-to-work distance to form the droplets with varying sizes in response to the temperature of the region of the part, and control application of the droplets with varying sizes to the part based on the temperature, wherein the plurality of droplets is configured to build up the part at the region; and
- in the case of the geometric characteristic of the region of the part being determined, control application of the droplets with varying sizes to the part based the geometric characteristic of the region of the part, wherein the plurality of droplets is configured to build up the part at the region.

15. The system of claim 14, wherein the part is disposed on a substrate configured to support and moderate temperature of the part during the additive manufacturing process.

16. The system of claim 11, wherein the operational characteristic corresponds to a wire feeder operational characteristic or a welding system operational characteristic.

17. The system of claim 16, wherein the wire feeder operational characteristic comprises a wire feeder motor speed, a wire feeder motor direction, a wire oscillation frequency, a torque, or a motor angle.

18. The system of claim 14, wherein the operational characteristic of the welding type power supply comprises a torch travel speed, a torch travel angle, a power output, or a power output waveform.

19. The system of claim 1, wherein operational characteristic of the system comprises a torch travel speed, a torch travel angle, a contact to work distance, a power output, a power output waveform, a wire feeder motor speed, a wire feeder motor direction, a wire oscillation frequency, a torque, or a motor angle.

* * * * *